United States Patent [19]

Kawaguchi et al.

[11] Patent Number: 5,349,226
[45] Date of Patent: Sep. 20, 1994

[54] ACTIVE MATRIX SUBSTRATE HAVING A CONTACT PAD FOR DETECTING BUS LINE SIGNALS

[75] Inventors: Takafumi Kawaguchi, Yamatotakada; Shiro Takeda, Tenri, both of Japan

[73] Assignee: Sharp Kabushiki Kaisha, Osaka, Japan

[21] Appl. No.: 813,268

[22] Filed: Dec. 24, 1991

[30] Foreign Application Priority Data

Dec. 28, 1990 [JP] Japan .................. 2-409176

[51] Int. Cl.$^5$ .............................. G02F 1/13
[52] U.S. Cl. .................... 257/347; 257/784; 359/54; 359/87; 359/88
[58] Field of Search ............ 359/54, 59, 82, 83, 359/87, 88; 357/4, 23.7; 257/347, 351, 780, 781, 784

[56] References Cited

U.S. PATENT DOCUMENTS

| | | | |
|---|---|---|---|
| 4,145,120 | 3/1979 | Kubota | 359/87 |
| 4,586,789 | 5/1986 | Kishimoto et al. | 359/87 |
| 4,752,118 | 6/1988 | Johnson | 359/87 |
| 4,807,973 | 2/1989 | Kawasaki | 359/59 |
| 4,810,061 | 3/1989 | Nakanowatari et al. | 359/87 |
| 4,840,459 | 6/1989 | Strong | 359/87 |
| 4,954,700 | 10/1990 | Takabayashi | 359/88 |
| 5,068,748 | 11/1991 | Ukai et al. | 257/59 |
| 5,089,750 | 2/1992 | Hatada et al. | 359/62 |

FOREIGN PATENT DOCUMENTS

| | | | |
|---|---|---|---|
| 52-74255 | 6/1977 | Japan | 359/88 |
| 53-68099 | 5/1978 | Japan | 359/88 |
| 59-205737 | 11/1984 | Japan | 359/59 |
| 60-2989 | 1/1985 | Japan | 359/54 |
| 60-130721 | 7/1985 | Japan | 359/88 |
| 61-174512 | 8/1986 | Japan | 359/87 |
| 63-135918 | 6/1988 | Japan | 359/88 |
| 63-264730 | 11/1988 | Japan | 359/88 |
| 2-248926 | 10/1990 | Japan | 359/88 |

*Primary Examiner*—Rolf Hille
*Assistant Examiner*—Minhloan Tran
*Attorney, Agent, or Firm*—Nixon & Vanderhye

[57] ABSTRACT

In an active matrix substrate including an array of thin film transistors arranged in a matrix, source buses and gate buses formed on an insulating substrate, a contact pad is formed on the source buses and the gate buses so that a metal portion of these buses is exposed, in order to provide an access for probing to monitor the waveform of signals.

4 Claims, 4 Drawing Sheets

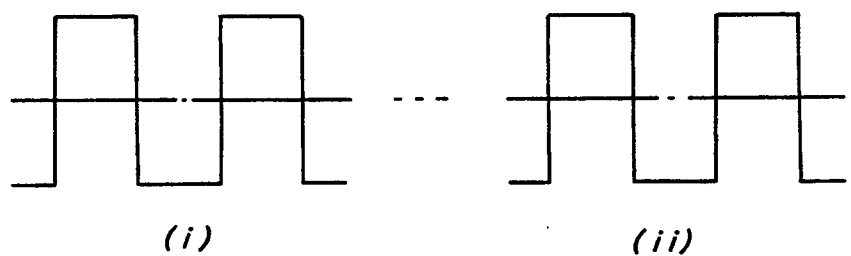
Fig. 4a  (i)  (ii)
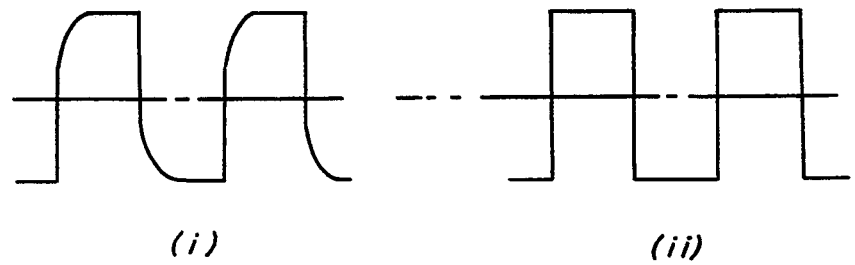
Fig. 4b  (i)  (ii)
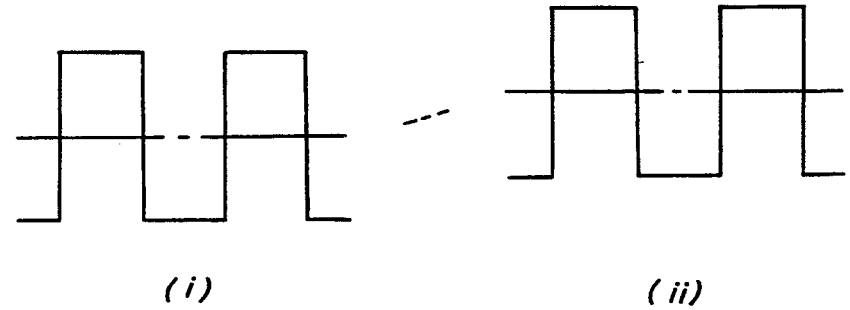
Fig. 4c  (i)  (ii)

ACTIVE MATRIX SUBSTRATE HAVING A CONTACT PAD FOR DETECTING BUS LINE SIGNALS

BACKGROUND OF THE INVENTION

1. Field of the Invention

The present invention relates to an active matrix substrate comprising an array of thin film transistors formed on an insulating substrate, which constitutes an active matrix display device in combination with a liquid crystal as a display medium and the like.

2. Description of the Prior Art

An active matrix liquid crystal display device employing a "chip on glass" (COG) method is known, in which driver ICs supplying drive signals to source buses and gate buses for a thin film transistor (TFT) array are directly mounted in the form of a chip on an insulating substrate on which the TFT array together with the source buses and the gate buses is formed.

FIG. 7 shows the above type conventional active matrix liquid crystal display device, which comprises a TFT array 2 formed with TFTs arranged in a matrix on a glass substrate 1. Source buses 20 and gate buses 21 running through the area of the TFT array 2 so as to be connected to each TFT are connected to a source bus driver IC 3 and a gate bus driver IC 4, respectively. These driver ICs 3 and 4 are also mounted on the glass substrate 1 in the form of a chip. A counter glass substrate 5 is placed over the whole area of the TFT array 2 with a liquid crystal portion 7 interposed therebetween.

FIG. 8 shows the structure of the source bus driver IC 3 mounted on the glass substrate 1 and connected with the source bus 20. The source bus 20 is covered with an insulating film 6 with an exception of an uncovered COG connection 30 where the source bus 20 is connected to the source bus driver IC 3. The COG connection 30 is positioned underneath the source bus driver IC 3, thereby protecting the uncovered metal of the source bus 20 from being exposed to the outside when the source bus driver IC 3 is mounted on the substrate. The gate bus driver IC 4 mounted on the glass substrate 1 and connected with the gate bus 21 has the same structure as the source bus driver IC 3 as described above.

Generally, in an active matrix liquid crystal display device, the quality of display may be degraded because of an electrical factor. In such a case, the waveform of a signal input to the source bus 20 or the gate bus 21 can be monitored and inspected during the drive of the liquid crystal panel having an area corresponding to the area occupied by the TFT array 2, so as to analyze the cause.

The monitoring of the signal waveform is normally performed by putting a probe in contact with the metal of the bus. However, in the above conventional active matrix liquid crystal display device, this monitoring during the drive of the liquid crystal panel is not possible, because, as described above, no part of the metal is exposed to the outside for providing an access for probing. The monitoring may be possible if the insulating film 6 covering the bus is partly removed to form an exposed metal portion on the bus. However, it is difficult to remove only the insulating film 6 from the metal, and further, if the insulating film 6 is successfully removed, it is also difficult to put the probe in contact with the bus which is fine and thin (width: 10 μm, thickness: 400 nm) without causing troubles such as breakage and cutting.

The objective of the present invention is to provide an active matrix substrate in which the waveform of signals input to the buses can be easily monitored by visual probing without troubles such as breakage and cutting.

SUMMARY OF THE INVENTION

The active matrix substrate of this invention, which overcomes the above-discussed and numerous other disadvantages and deficiencies of the prior art, comprises an array of thin film transistors arranged in a matrix on an insulating substrate, at least two groups of gate buses, and at least two groups of source buses, wherein the gate buses and the source buses comprise a contact pad formed thereon such that a metal portion thereof is exposed.

In a preferred embodiment, one group of the gate buses are connected to a first gate bus driver IC and the other group thereof to a second gate bus driver IC, and one group of the source buses are connected to a first source bus driver IC and the other group thereof to a second source bus driver IC, and the contact pad is formed on each of the outermost gate buses and source buses of each group.

In a preferred embodiment, the contact pad includes a triangle contact portion and a circle contact pad area formed in the center of the contact portion by removing an insulating film covering the gate bus and the source bus so as to have a metal exposed portion.

According to the present invention, the contact pad is formed on a bus by uncovering the metal of the bus. Thus, a probe can be visually put in contact with the metal during the actual operation of the active matrix liquid crystal display device, so as to monitor the waveform of signals input to the bus. In this way, the actual cause of the degraded quality of display which is caused by an electrical factor can be detected without causing further troubles such as breakdown and cutting of the bus. In addition, the present invention makes it possible to confirm whether the driver ICs, the TFT array, and the like actually operate according to the design.

BRIEF DESCRIPTION OF THE DRAWINGS

This invention may be better understood and its numerous objects and advantages will become apparent to those skilled in the art by reference to the accompanying drawings as follows:

FIGS. 4a, 4b, and 4c are waveform charts of signals monitored from buses;

DESCRIPTION OF THE PREFERRED EMBODIMENT

Figure 1A:
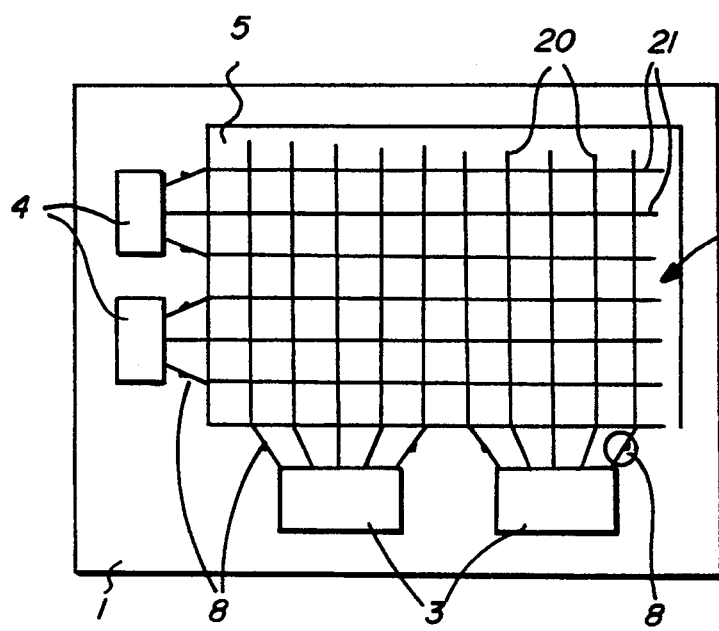
FIG. 1a and FIG. 1b are plan views of a COG-type active matrix liquid crystal display device incorporating an active matrix substrate of the present invention, with an enlarged view of a contact pad.
Figure 1B:
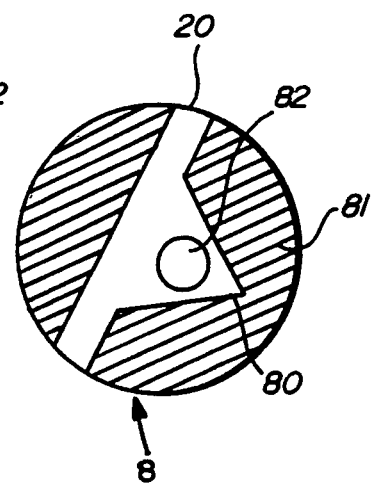
Figure 2:
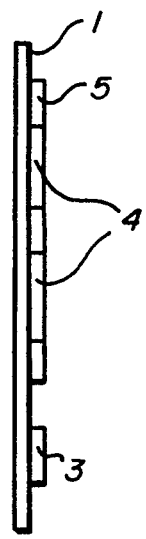
FIG. 2 is a side view of the active matrix liquid display device of FIG. 1.

Referring to FIGS. 1 and 2, a COG-type active matrix liquid crystal display device comprises an active matrix substrate of the present invention which includes a glass substrate 1 and a TFT array 2 formed with TFTs arranged in a matrix on the glass substrate 1, and source buses 20 and gate buses 21 running through the area of the TFT array 2 so as to be connected to each TFT. The source buses 20 and the gate buses 21 are respectively connected at their signal input ends to a source bus driver IC 3 and a gate bus driver IC 4, both of which are directly mounted on the glass substrate 1 in the form of a chip. A counter glass substrate 5 is placed over the whole area of the TFT array 2, thus constituting the structure of a liquid crystal panel.

As shown in FIG. 1b, a contact pad 8 is formed on a portion of the source bus 20 and the gate bus 21 near the signal input end thereof outside the area of the TFT array 2. In this example, the contact pad 8 is formed on the two source buses 20 located outermost of a block of the source buses 20 connected to one source bus driver IC 3. Likewise, the contact pad 8 is formed on the two gate buses 21 located outermost of a block of the gate buses 21 connected to one gate bus driver IC 4.

Figure 3:
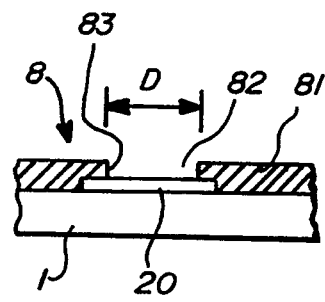
FIG. 3 is a sectional view of the contact pad of FIG. 1.

The contact pad 8 formed on the source bus 20, for example, comprises a triangle contact portion 80 and a circle contact pad area 82 formed in the center of the contact portion 80 by removing an insulating film 81 covering the source bus 20. As shown in FIG. 3, the metal of the source bus 20 is exposed in the contact pad area 82, and a predetermined depth of this area from the surface of the insulating film 81 is formed. The diameter D of the contact pad area 82 is preferably about 1 mm. The contact pad 8 formed on the gate bus 21 has the same structure as described above.

Thus, with the above contact pad 8 which includes the contact pad area 82 having a diameter of about 1 mm and a predetermined depth 83, it is ensured that the tip of the probe contacts with the metal through the contact pad area 82. In this way, the visual probing can be easily performed, so as to monitor the input signals and inspect, for example, the variation in the output characteristics of the driver ICs 3 and 4, abnormal operations of the driver ICs 3 and 4, and the influence of the floating volume in the liquid crystal panel on the coupling of each bus.

The monitoring and inspection on the active matrix substrate of this invention will be described as follows, taking an example of the variation in the output characteristics between two source bus driver ICs 3.

When the output characteristics differs between two source bus driver ICs 3, the brightness on the display screen of the active matrix liquid crystal display device differs depending on blocks of source buses. One block is composed of the source buses 20 connected to one source bus driver IC 3. When such a difference in brightness occurs, it is presumed that the output levels of the source bus driver ICs 3 are different from each other, but the actual cause for this trouble is only detected by directly monitoring the waveforms of the output signals from the respective source bus driver ICs 3.

Each of FIGS. 4a, 4b, and 4c shows waveforms (i) and (ii) of signals output from the two source bus driver ICs 3 monitored by putting the tip of the probe in contact with the metal of the source buses 20 connected to the respective source bus driver ICs 3.

In FIG. 4a, the two waveforms (i) and (ii) are the same showing a regular pulse, indicating that the quality of the display is good without any trouble as described above.

In FIG. 4b, on the contrary, the waveform (i) is deformed; i.e., the rise and falling edges of the pulse are dull. It is evident from the waveforms (i) and (ii) that the output impedance of one of the source bus driver ICs 3 is higher than the other, causing the trouble of different brightness on the display screen depending on the blocks.

FIG. 4c shows the case where the output DC level of one of the source bus driver ICs 3 which outputs signals of the waveform (i) is lower than that of the other source bus driver IC 3 which outputs signals of the waveform (ii). This can be promptly observed by comparing the two waveforms.

From the above-described examples, though they are very simple ones, it is clear that by comparing the waveforms of signals output from two source bus driver ICs 3 causes of various inferiorities on the display screen can be promptly identified, and as a result appropriate measures corresponding to the inferiorities can be taken.

Many of these inferiorities tend to occur in one source bus driver IC 3 or one gate bus driver IC 4. Therefore, the structure of the present invention in which two contact pads 8 are provided on each of the source bus driver ICs 3 and the gate bus driver ICs 4 has a great advantage of being able to find out causes of most inferiorities.

Figure 5:
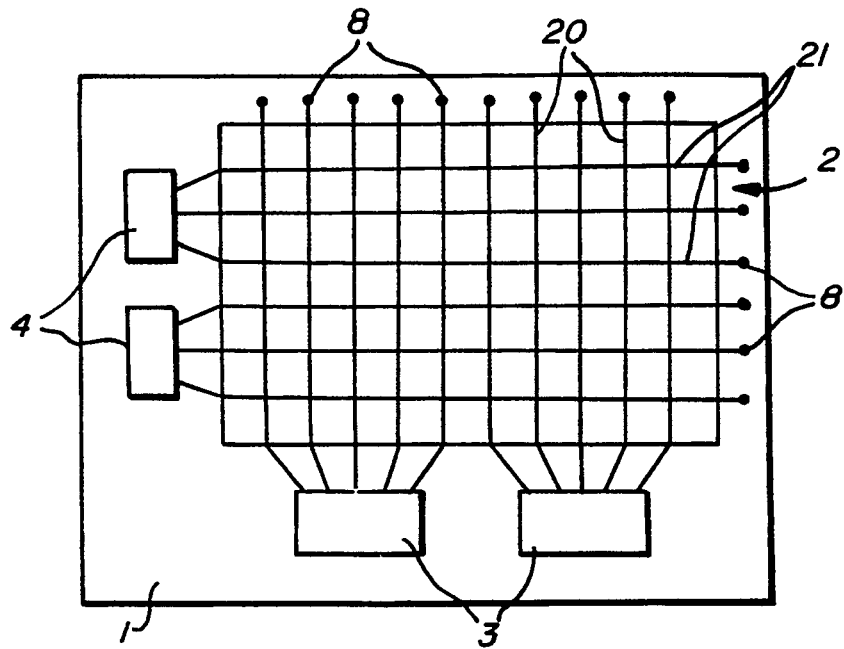
FIG. 5 is a plan view of a COG-type active matrix liquid crystal display device incorporating another active matrix substrate of the present invention.
Figure 6:
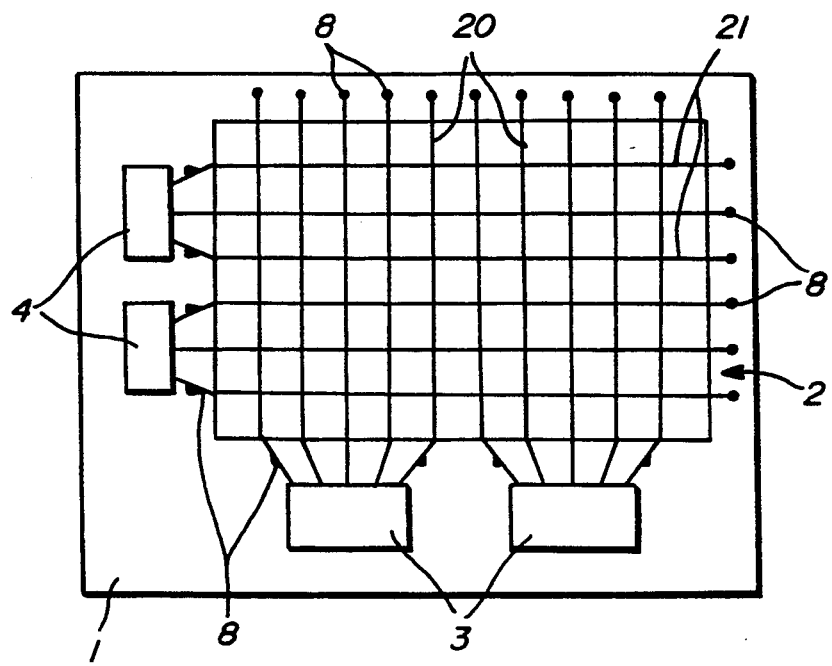
FIG. 6 is a plan view of a COG-type active matrix liquid crystal display device incorporating yet another active matrix substrate of the present invention.
Figure 7:
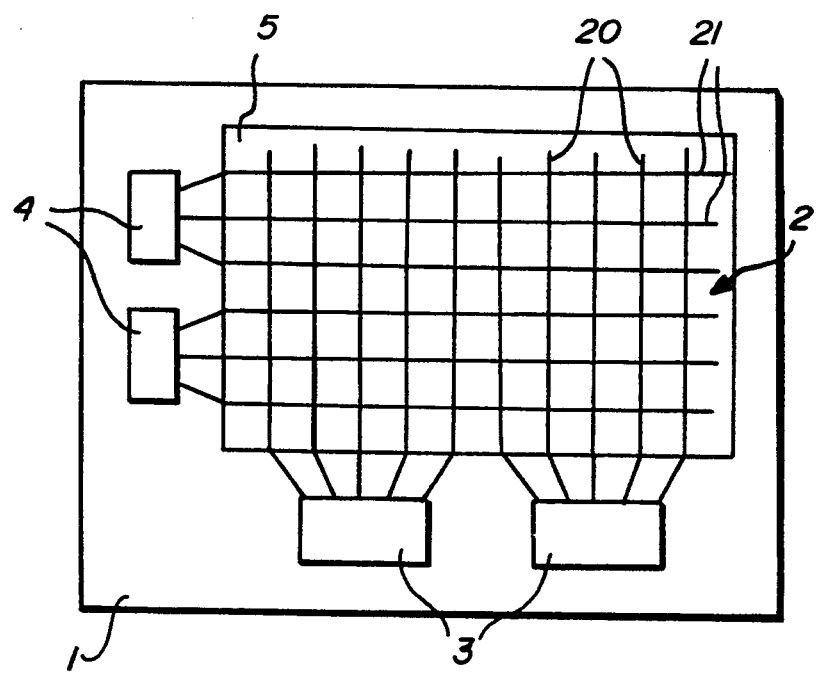
FIG. 7 is a plan view of a conventional COG-type active matrix liquid crystal display device.
Figure 8:
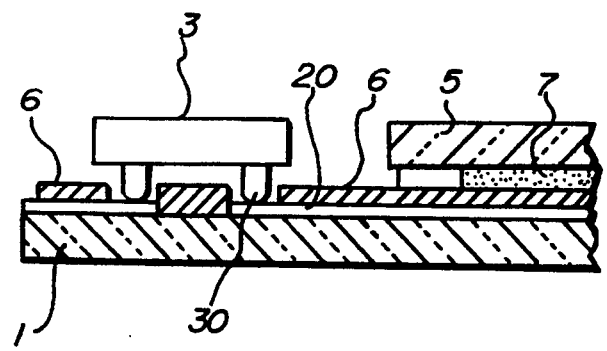
FIG. 8 is a sectional view of a COG connection of the active matrix liquid crystal display device of FIG. 7.

Other examples of the active matrix substrate according to the present invention are shown in FIGS. 5 and 6. In FIG. 5, the contact pads 8 are formed on the ends of all buses opposite to the signal input ends. In FIG. 6, the contact pads 8 are formed both on the signal input ends of the selected buses as described in the first example, and on the ends of all buses opposite to the signal input ends.

The present invention is also applicable to an active matrix liquid crystal display device where a driver circuit including the driver ICs 3 and 4 is formed in a liquid crystal panel or a tape automated bonding (TAB) type active matrix liquid crystal display device. Further, the contact pad according to the present invention may be formed on a guide line extended from the bus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix substrate comprising an array of thin film transistors arranged in a matrix on an insulating substrate, at least two groups of gate buses, and at least two groups of source buses, wherein the gate buses and the source buses comprise a contact pad for probing formed thereon such that a metal portion thereof is exposed, wherein one group of the gate buses are connected to a first gate bus driver IC and the other group thereof to a second gate bus driver IC, and one group of the source buses are connected to a first source bus driver IC and the other group thereof to a second source bus driver IC, and the contact pad is formed on each of the outermost gate buses and source buses of each group, and wherein the contact pad includes a triangle contact portion and a circle contact pad area formed in the center of the contact portion by removing an insulating film covering the gate bus and the source bus to have a metal exposed portion.

2. An active matrix substrate comprising an array of thin film transistors arranged in a matrix on an insulating substrate, at least two groups of gate buses, and at least two groups of source buses, wherein the gate buses and the source buses comprise a contact pad for probing formed thereon such that a metal portion thereof is exposed, and the contact pad includes a triangle contact portion and a circle contact pad area formed in the center of the contact portion by removing an insulating film covering the gate bus and the source bus to have a metal exposed portion.

3. An active matrix substrate comprising an array of thin film transistors arranged in a matrix on an insulating substrate, at least two groups of gate buses, and at least two groups of source buses, wherein the gate buses and the source buses comprise a probe contact pad formed thereon such that a metal portion thereof is exposed, wherein one group of the gate buses are connected to a first gate bus driver IC and the other group thereof are connected to a second gate bus driver IC, and one group of the source buses are connected to a first source bus driver IC and the other group thereof are connected to a second source bus driver IC, and the contact pad is formed on each of the outermost gate buses and source buses of each group between said source bus driver IC and the array of thin film transistors, and between said gate bus driver IC and the array of thin film transistors.

4. An active matrix substrate comprising an array of thin film transistors arranged in a matrix on an insulating substrate, at least two groups of gate buses, and at least two groups of source buses, wherein the gate buses and the source buses comprise a probe contact pad formed thereon such that a metal portion thereof is exposed, wherein the contact pad includes a triangle contact portion and a circle contact pad area formed in the center of the contact portion by removing an insulating film covering the gate bus and the source bus to have a metal exposed portion.

* * * * *